Oct. 25, 1927.

R. CHILTON 1,646,991

SPRING WHEEL

Filed Feb. 8, 1926

INVENTOR
ROLAND CHILTON

Oct. 25, 1927.
R. CHILTON
1,646,991
SPRING WHEEL
Filed Feb. 8, 1926 3 Sheets-Sheet 2
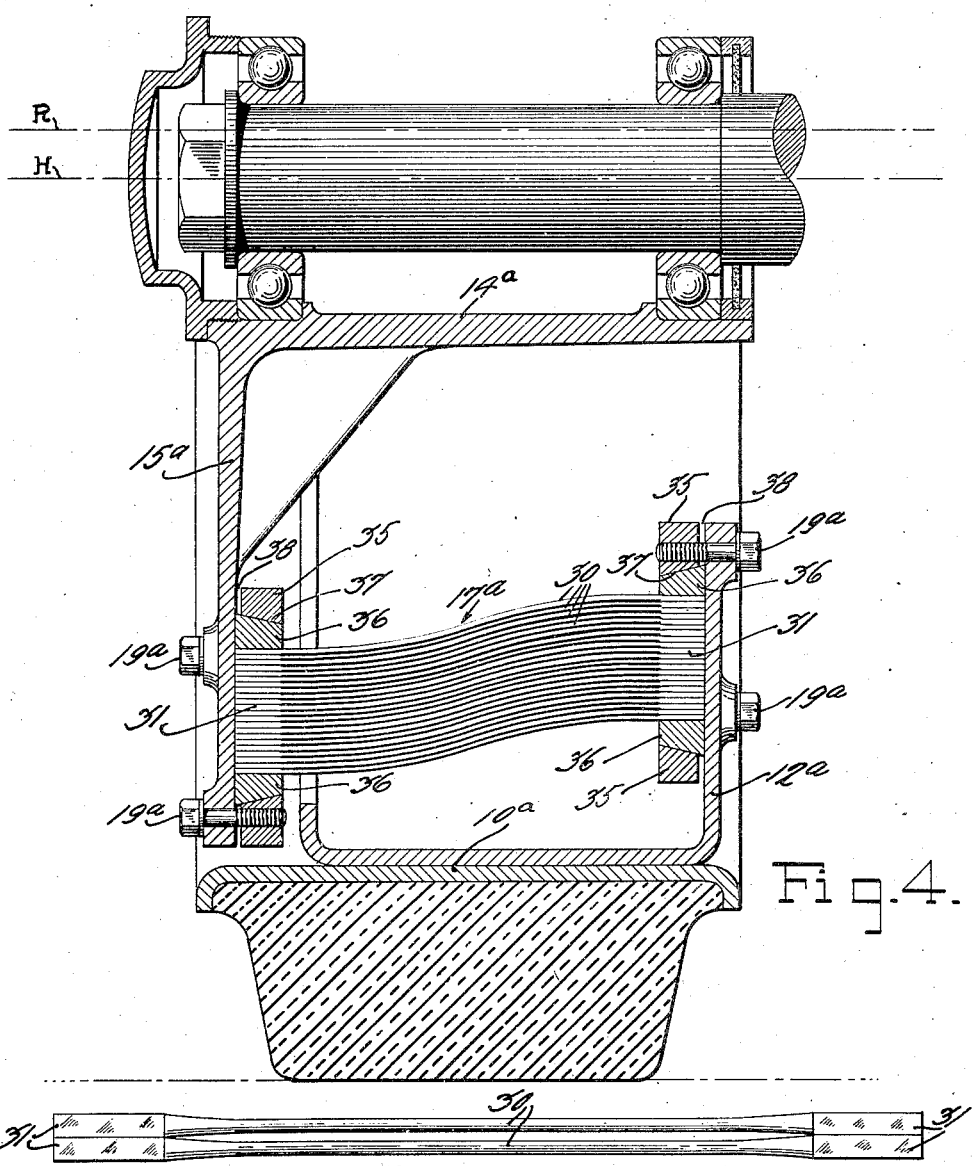
Fig. 4.
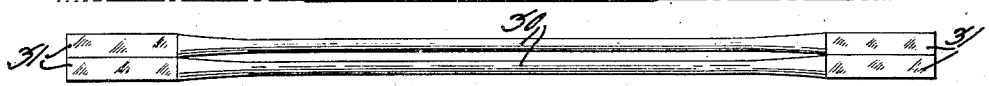
Fig. 5.
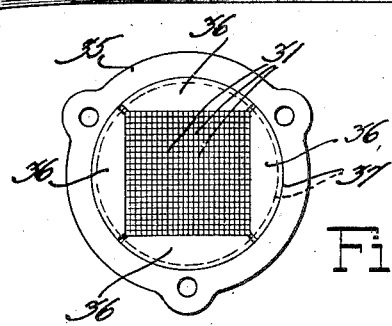
Fig. 6.
INVENTOR
ROLAND CHILTON
BY 
ATTORNEY Oct. 25, 1927.

R. CHILTON
SPRING WHEEL
Filed Feb. 8, 1926

INVENTOR
ROLAND CHILTON
BY
ATTORNEY

Patented Oct. 25, 1927.

1,646,991

UNITED STATES PATENT OFFICE.

ROLAND CHILTON, OF KEYPORT, NEW JERSEY, ASSIGNOR TO HEALEY-AEROMARINE BUS COMPANY, INC., A CORPORATION OF NEW YORK.

SPRING WHEEL.

Application filed February 8, 1926. Serial No. 86,863.

This invention relates to a type of wheel wherein the hub is resiliently supported from the rim as for flexible suspension of a vehicle.

One of the prime objects of this invention is to make each flexible supporting element uniform as to flexibility and supporting power throughout the various attitudes assumed during the revolution of a wheel.

In many of the known devices the spring elements are stressed in a varying manner as they are rotated through the zones beneath, horizontal with, and above, the hub. When the resilient elements have different spring characteristics under tangential than under radial loading only a few of the elements contribute usefully to the resilient support at one time. It is characteristic of a rubber tire for instance, that only that portion of the material directly above the area in contact with the road contributes to the support of the wheel loads and most constructions using annular resilient means within the wheel will be found to similarly only use a small proportion of the volume of the resilient material in support of the load in any one position of the wheel. This invention on the other hand, affords flexible suspension elements each having a constant degree of flexibility and a constant load carrying capacity in all the attitudes that they assume during revolution of the wheel.

A further object of this invention is to provide a wheel in which a relatively great amount of radial flexibility is provided in combination with relatively great resistance to sideways displacement of the rim, and a further object is to eliminate all sliding contact between hub and rim and all working joints such as may become damaged through dirt or corrosion or lack of lubrication.

These objects are obtained by a new form and disposition of the spring elements, each of which is circular in cross section about an axis disposed parallel to the axis of rotation of the wheel. One end of each element is secured to a rim member and the other end to a hub member and the latter is thus resiliently carried by the aggregate shear or bending resistance of all the elements, there being no other mechanical connections between the hub and the rim. Due to the form and disposition of each of these elements, they are equally strong and equally resilient as to all directions of loading and deflection parallel to the plane of the wheel.

The number and proportion of the flexible elements will vary widely with the materials used, and this invention is not limited to any particular material or method of fixing the flexible members to the hub and rim members. The drawings show alternative constructions wherein are a few elements of relatively large diameter and short lengths suited to materials having relatively great elastic yield, such as rubber; and a great number of elements of relatively small diameter and great length such as would be suited to utilize the resilient properties of spring steel.

Various other objects and advantages of the invention will be in part apparent from an inspection of the accompanying drawings and in part will be more fully set forth in the following particular description of embodiments of my invention, and the invention also consists in certain new and novel features of construction and combination of parts hereinafter set forth and claimed.

In the drawings:

Figure 4 is a fragmentary diametrical sectional view illustrating an alternative structure wherein the form of spring element shown is suited to a material having a relatively slight specific flexibility, such as spring steel for example.

Figure 5 illustrates in detail a pair of the spring elements shown in Figure 4.

Figure 6 is an end elevation of a spring unit such as shown in Figure 4.

Figures 1, 2, 3:
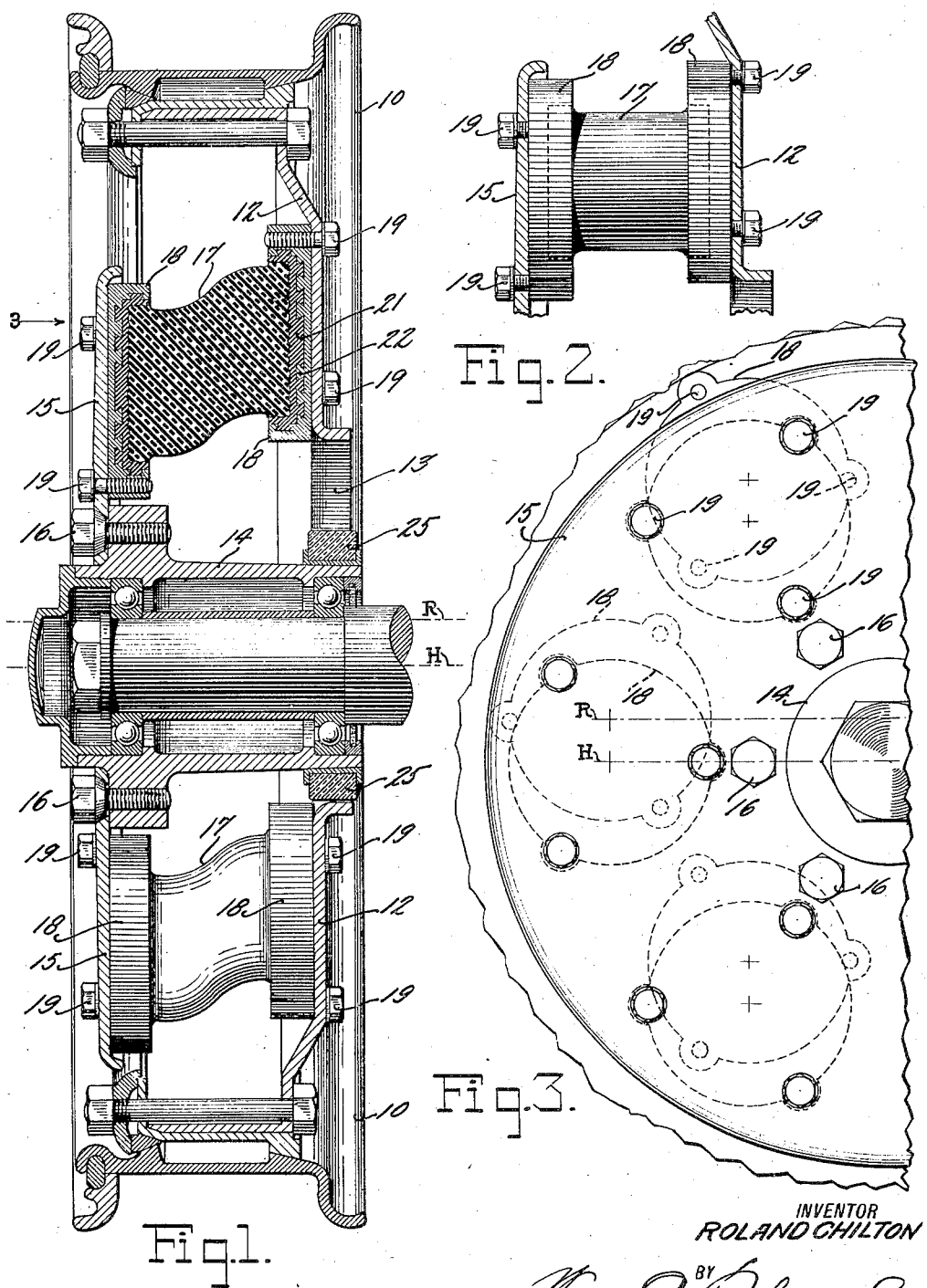
Figure 1 is a vertical transverse section taken substantially central, illustrating a preferred form of the invention in the deflected state and in which the resilient elements as shown are of such form as to be suitable to material having a relatively great elastic deflection capacity.
Figure 2 is a detail of one of such spring elements under undeflected conditions.
Figure 3 is a fragmentary side view of Fig. 1.

The broken lines indicated by R and H in the various figures of the drawings indicate the center lines of the hub and rim respectively under load and in which R designates the rim and H the hub.

In the present instance with reference to Figures 1, 2 and 3, 10, designates the rim portion of a wheel to which is secured a disk 12, which is provided with an opening 13. A hub 14 extends through the opening 13 and a disk 15 is secured to the hub by bolts 16. A rubber bumper 25 may be applied to the hub 14 to prevent excessive movement between the hub and the rim.

A plurality of flexible hub supporting elements 17 are disposed between the disks 12 and 15 and have their respective ends secured to the disks as by means of caps 18 and the screws 19.

Elements 17 of the form shown in Fig. 1 are preferably fabricated of soft rubber and according to one of the essential features of this invention are substantially circular in cross section. These elements are suitably secured to the disks as by being vulcanized to the hard rubber bases 21, which are in turn vulcanized to the metallic caps 18, suitable under-cut means 22 being provided to assist in thoroughly binding the whole together.

As shown in Figures 1 and 3 the elements 17 are under lateral distortion and it will be seen that by the formation and disposition disclosed each and all of these elements contribute with the same effectiveness to the flexible support of the load in all the various attitudes which they assume during the rotation of the wheel.

With reference to Figures 4, 5, and 6, spring steel is contemplated as the material of the flexible hub supporting units 17$^a$, which accordingly are formed of a multiplicity of relatively long and small diameter elements 30 having relatively large end portions 31 of such form in cross section as may be conveniently nested together as shown in Figure 6.

These spring steel elements are circular in cross section intermediate their fixed ends and they are preferably suitably graduated in diameter towards their central portions so as to have substantially uniform bending stress throughout their free length.

In the specific means shown in Figures 4 and 6 for securing the spring members to the hub 14$^a$ and rim 10$^a$ respectively, the ends 31 of the spring members are secured together within an annular holding member 35 by the segmental members 36, which are exteriorly tapered to fit a corresponding tapered bore in the ring 35. It will be understood that when the ring 35 is forced down upon the segmental members 36 the ends 31 of the spring members 30 will be clamped together and the exposed ends may be welded together to more securely bind them together.

The screws 19$^a$ secure the ends of the units 17$^a$ respectively to the disks 12$^a$ and 15$^a$ and a clearance 38 is preferably provided between the disks and the annular members 35 so that the screws 19$^a$ will tend to more firmly compress the ends of the spring members.

Figure 7:
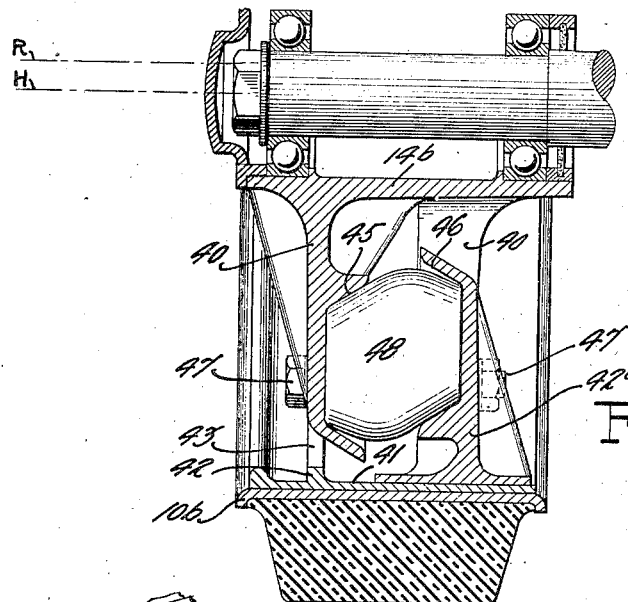
Figure 7 is a fragmentary diametrical sectional view on a small scale and illustrates an alternative means of securing resilient elements of the general character shown in Figures 1 to 3.
Figure 8:
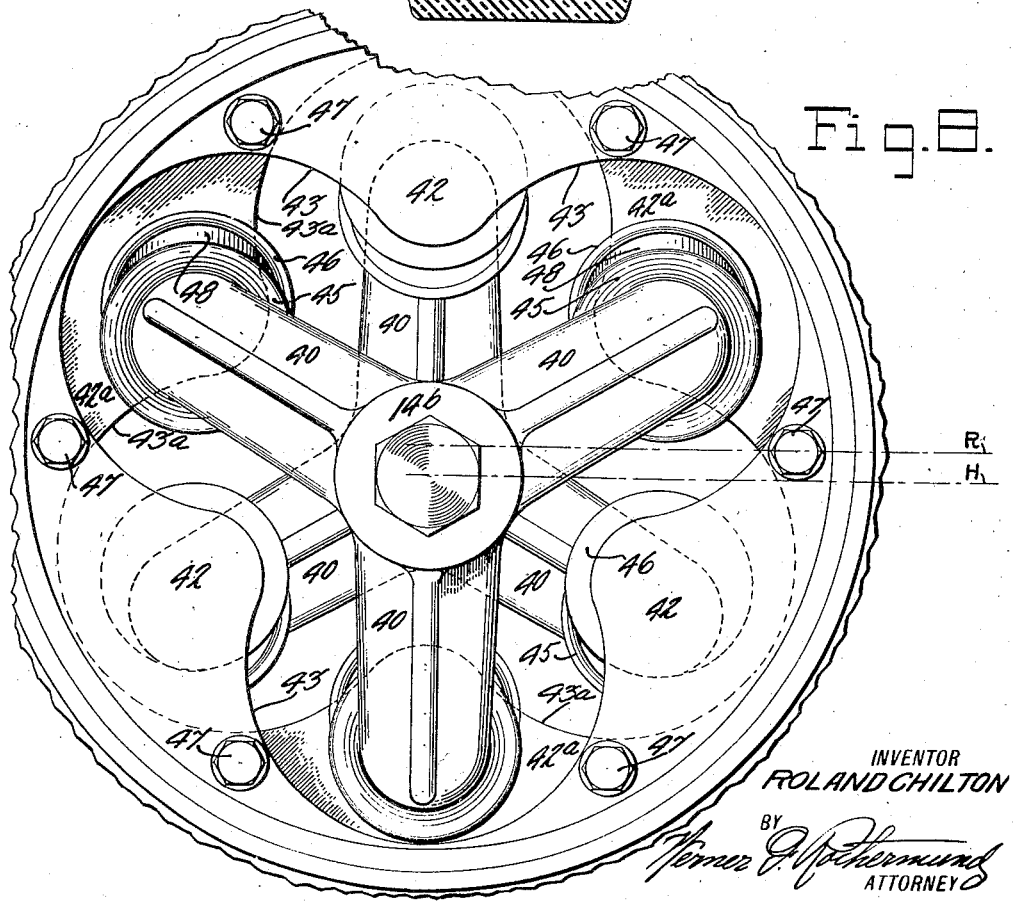
Figure 8 is a fragmentary side view of the form shown in Fig. 7.

With reference to Figures 7 and 8 the drawings disclose a hub 14$^b$ having arms 40 radially extending therefrom in a manner so as to form a double spider. These arms are shown integral with the hub portion and are so spaced that the arms disposed at the inner side of the wheel extend radially between those disposed at the other side of the wheel.

Secured to the rim 10$^b$ by means of a flange 41 is a disk 42 having in this instance a trilobate opening 43 adapted to provide a clearance for the arms 40 in their movement relative to the disk. A mating disk 42$^a$ is slidably mounted on the flange 41 and has its openings 43$^a$ disposed so as to alternate with the openings 43 of the other disk.

On the end of each of the arms 40 there is formed a cup 45, and similar cups 46 are formed on the disks 42 and 42$^a$. These cups are oppositely disposed, that is to say, the cups of the disks are disposed opposite to those of the arms. By means of the shearing or bending resiliency of the blocks 48 as illustrated by the deflected condition shown in Fig. 7, the hub is resiliently supported within the rim and also guided thereby against axial displacement relative to the rim. Draw bolts 47 are provided which extend through the disks and are adapted to create pressure upon rubber blocks 48 so as to securely hold the same between the cups, and to exert an initial compression on the blocks against side displacement of the rim.

It will be understood that the resilient elements 17, 17$^a$ and 48 although laterally yieldable for bending are practically inextensible and noncompressible axially within the ordinary meaning of the term, and it is due to this characteristic of said elements that the rim portion of the wheel is maintained substantially in its normal plane of rotation without resort to other guiding means.

Variations may be resorted to within the scope of the invention and portions of the improvements may be used without the other.

Having thus described my invention, I claim:

1. In a wheel of the character described having a rim and a hub, the combination of a plurality of resilient members forming a support for the hub within the rim, said resilient members being substantially non-yieldable for axial extension and having their ends secured to a portion of the rim and the hub respectively, said members being so formed and disposed that the ends thereof remain in substantially equidistantly spaced relation during spring movement.

2. In a wheel of the character described having a rim and a hub, the combination of a resilient means forming a support for the hub within the rim, said resilient means comprising a plurality of units, each unit formed of a multiplicity of spring members having their ends connected to a portion of the rim and the hub respectively, said units so disposed that the opposed ends of the individual spring members shall remain substantially equidistantly spaced during spring action of the wheel.

3. In a wheel the combination of a hub and a rim having overlapping extensions, a plurality of resilient members each having equal flexibility in all directions of lateral displacement but substantially non-yieldable for axial extension, said members forming the sole connection between said overlapping extensions and disposed so that each element in its undeflected state lies parallel to the axes of the hub and the rim.

4. A means for suspending a hub within a rim for radial spring action therebetween, comprising in combination a plurality of resilient elements each equally flexible in all directions of relative lateral displacement of their ends and relatively non-yieldable for axial extension, and means at the ends of the elements for securing the same to the hub and the rim respectively in substantial axial parallellism therewith.

5. In a wheel having a hub and a rim member, a plurality of substantially non-compressible elements of flexible material, means for securing one end of each element to the hub member and the rim member respectively, the whole so organized that said means shall remain substantially equidistantly spaced during radial displacement of the hub.

6. In a wheel having a hub and a rim, means for controlling the hub and the rim for relative radial spring action, comprising substantially cylindrical laterally resilient elements adapted to prevent relative angular deflection of the hub and rim and disposed approximately parallel to the wheel axis and secured at one end of each element to a member rigid with the rim and at the other end to a member rigid with the hub.

7. In a wheel having a hub and a rim adapted for relative radial movement, means for flexibly supporting the hub within the rim comprising elements which are flexible only for lateral deflection in all directions, and means for securing one end of each of said elements to the hub and the other end to the rim; each of said elements being normally disposed parallel to the axis of the wheel.

8. In a wheel having a hub and a rim, means for securing the hub to the rim for spring action therebetween, comprising a plurality of spring elements substantially cylindrical about an axis disposed substantially parallel to the wheel axis, said elements being the means of rigid lateral location of the rim and the hub.

9. In a resilient wheel having a hub member and rim member, means flexible for bending distortion only disposed substantially parallel to the axis of rotation of the wheel and secured rigidly at one end to the hub member and at the other end to the rim member.

10. The combination with a wheel having a rim member and a hub member adapted for relative radial movement within said rim member, of a plurality of laterally flexible and axially non-extendible elements disposed between said rim and hub member in a manner so that the undeflected axes of said elements are parallel to the axes of said rim and hub member, each of said elements having one end connected to the rim member and the other end to the hub member.

11. The combination with a wheel having a rim member and a hub member adapted for relative radial movement within said rim member, of a plurality of flexible elements disposed longitudinally parallel in their normal condition to the axis of the hub, and means for connecting opposed ends of each of said elements to the rim member and hub member respectively; said elements being adapted for only lateral displacement of one of their ends relative the other and further adapted to maintain the rim member in its normal plane of rotation.

12. In a wheel having a rim member and a hub member adapted for relative radial movement, a plurality of flexible elements longitudinally disposed in their undeflected state parallel to the axis of said hub, said elements having their ends connected to the rim and the hub members respectively and adapted to yieldingly resist lateral distortion under load, said elements being further adapted to prevent angular deflection of the rim member from its normal plane of rotation.

13. In a wheel, the combination comprising a rim having a portion radially extended toward its axis, a hub having a portion radially extended, a plurality of resilient elements forming the sole connection between the radially extended portions of the hub and the rim respectively and so disposed that each element in its undeflected condition will lie parallel to the axes of the hub and rim;

said elements being axially non-extendible and supporting the hub within the rim for radial spring movement.

14. In a wheel, the combination of a hub and a rim having overlapping extensions, a plurality of resilient units forming a connection between said extensions, said units formed of a multiplicity of spring elements bound together at opposite ends and secured thereat to the extensions of the hub and rim respectively and so disposed that each unit in its undeflected state lies parallel to the axes of the hub and rim.

15. In a wheel, the combination of a hub having a portion radially extended therefrom, a rim having a portion radially extended therefrom towards said hub, a plurality of resilient units forming a connection between said rim and hub, said units formed of a multiplicity of spring elements having relatively enlarged end portions connected together, the ends of said units being secured to the radially extended portions of the hub and rim respectively and so disposed that each unit in its normal undeflected state lies in a plane parallel to the axes of the hub and rim.

Signed at Keyport, in the county of Monmouth, and State of New Jersey this 4th day of February, A. D. 1926.

ROLAND CHILTON.